(12) United States Patent
Ronen et al.

(10) Patent No.: US 10,692,012 B2
(45) Date of Patent: Jun. 23, 2020

(54) CLASSIFYING TRANSACTIONS AT NETWORK ACCESSIBLE STORAGE

(71) Applicant: Microsoft Technology Licensing, LLC, Redmond, WA (US)

(72) Inventors: Royi Ronen, Tel-Aviv (IL); Peiheng Hu, Kirkland, WA (US); Lars Mohr, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 837 days.

(21) Appl. No.: 15/168,059

(22) Filed: May 29, 2016

(65) Prior Publication Data

US 2017/0344901 A1 Nov. 30, 2017

(51) Int. Cl.
| | |
|---|---|
| *G06N 20/00* | (2019.01) |
| *G06F 21/50* | (2013.01) |
| *G06N 5/04* | (2006.01) |
| *H04L 29/06* | (2006.01) |

(52) U.S. Cl.
CPC ............ *G06N 20/00* (2019.01); *G06F 21/50* (2013.01); *G06N 5/04* (2013.01); *H04L 63/1425* (2013.01)

(58) Field of Classification Search
CPC .......... G06N 20/00; G06N 5/04; G06F 21/50; H04L 63/1425
See application file for complete search history.

(56) References Cited

U.S. PATENT DOCUMENTS

| | | | |
|---|---|---|---|
| 7,516,476 B1 | 4/2009 | Kraemer et al. | |
| 7,555,769 B1 | 6/2009 | Shapiro et al. | |
| 7,971,230 B2 | 6/2011 | Agarwal et al. | |
| 8,015,133 B1* | 9/2011 | Wu .................... | H04L 63/1425 706/21 |
| 8,554,703 B1 | 10/2013 | Lin et al. | |
| 8,621,553 B2 | 12/2013 | Syed et al. | |
| 8,769,613 B2 | 7/2014 | Latchem et al. | |
| 8,819,767 B2 | 8/2014 | Loureiro et al. | |

(Continued)

FOREIGN PATENT DOCUMENTS

| | | |
|---|---|---|
| WO | WO 01/99031 | 12/2001 |
| WO | WO 2013/164821 | 11/2013 |

OTHER PUBLICATIONS

Uknown author, Combining Models, as archived Apr. 5, 2015, https://www.cs.toronto.edu/~urtasun/courses/CSC2515/08ensemble-2515.pdf, p. 3 (Year: 2015).*

(Continued)

*Primary Examiner* — Austin Hicks
(74) *Attorney, Agent, or Firm* — Workman Nydegger

(57) ABSTRACT

A computerized method of classifying network accessible storage transactions at network accessible storage. The method comprises obtaining an client predictive security model for anomaly or malfunctioning detection, the client predictive security model is dynamically created by an analysis of a plurality of client transactions made to access target data stored in an client computing device, monitoring a plurality of network accessible storage transactions made to access a replica of the target data when the replica is stored in an network accessible storage, and classifying at least some of the plurality of network accessible storage transactions based on the client predictive security model.

20 Claims, 3 Drawing Sheets

(56) References Cited

U.S. PATENT DOCUMENTS

| | | |
|---|---|---|
| 9,037,711 B2 | 5/2015 | Maida-Smith et al. |
| 9,306,957 B2 * | 4/2016 | Igelka ................. H04L 63/1441 |
| 2005/0193222 A1 | 9/2005 | Greene |
| 2010/0217850 A1 | 8/2010 | Ferris |
| 2011/0314069 A1 | 12/2011 | Alatorre et al. |
| 2013/0074158 A1 | 3/2013 | Koskimies et al. |
| 2014/0250491 A1 | 9/2014 | Fleischman et al. |
| 2014/0280142 A1 | 9/2014 | Wasson et al. |
| 2014/0304326 A1 | 10/2014 | Wesley et al. |
| 2014/0325605 A1 | 10/2014 | Jung et al. |
| 2014/0337971 A1 | 11/2014 | Casassa Mont et al. |

OTHER PUBLICATIONS

Wilber et al, Learning Concept Embeddings with Combined Human-Machine Expertise, as archived Apr. 28, 2016, https://vision.cornell.edu/se3/wp-content/uploads/2015/09/main.pdf, p. 8 (Year: 2016).*

Fellin et al, Preventing Mistraining of Anomaly-Based IDSs through Ensemble Systems, IEEE, 2014 (Year: 2014).*

IBM "Safeguarding the Cloud With IBM Dynamic Cloud Security", IBM Software, Solution Brief, IBM Corporation, 6 P., Oct. 2014.

Vormetric "Vormetric Data Security for Microsoft Azure. Challenge: Ensuring Data Security, Control, and Compliance in the Cloud", Vormetric Data Security, Vormetric Inc., Solution Brief, 2 P., 2015.

Wang et al. "Ensuring Data Storage Security in Cloud Computing", Proceedings of the 17th International Workshop on Quality of Service, IWQoS 2009, Charleston, SC, USA, Jul. 13-15, 2009, p. 1-9, 2009.

International Search Report and the Written Opinion dated Jul. 24, 2017 From the International Searching Authority Re. Application No. PCT/US2017/033896. (11 Pages).

* cited by examiner

CLASSIFYING TRANSACTIONS AT NETWORK ACCESSIBLE STORAGE

BACKGROUND

Off-premises storage, for example on cloud storage is used for storing original data and old working datasets which are replicated from on-premises storage. Off-premises storage is also used as part of Hybrid cloud storage that uses both on-premises and off-premises resources. Off-premises storage is also used for storing updates from client machines, logs and transaction collection.

Analyzing access patterns for security purposes typically consists of creating a security model, for example a baseline and measuring a deviation from the baseline, either based on hand-crafted rules or automatically-learned patterns which are extracted from monitored actions and/or changes, for instance using Machine Learning and/or Data Mining techniques. Deviations above and/or below a threshold, for instance deviations having a low occurrence probability are flagged as anomalies and usually ignored.

SUMMARY

According to some examples which are described herein there are provided methods and systems for classifying off-premises transactions monitored at off-premises storage, for instance cloud storage, based on a security model learned from transaction data associated with target data that is stored in on-premises storage of an on-premises device, such as a client terminal. The security model is optionally adapted based on activity (also referred to as a behavior) detected on the off-premises storage and used for detecting anomalies among transactions associated with a replica of the target data which is stored in off-premises storage.

Optionally, the security model, referred to herein as an on-premises predictive security model or client predictive security model, is based on baseline(s) for detecting anomaly and/or tags for supervised learning which are determined based on an analysis of on-premises transactions monitored at the on-premises storage.

Unless otherwise defined, all technical and/or scientific terms used herein have the same meaning as commonly understood by one of ordinary skill in the art. Although methods and materials similar or equivalent to those described herein can be used in the practice or testing of examples of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some examples of the disclosure are herein described, by way of example only, with reference to the accompanying drawings. With specific reference now to the drawings in detail, it is stressed that the particulars shown are by way of example and for purposes of illustrative discussion of examples of the disclosure. In this regard, the description taken with the drawings makes apparent to those skilled in the art how examples of the disclosure may be practiced.

In the drawings.

DETAILED DESCRIPTION

Figure 1:
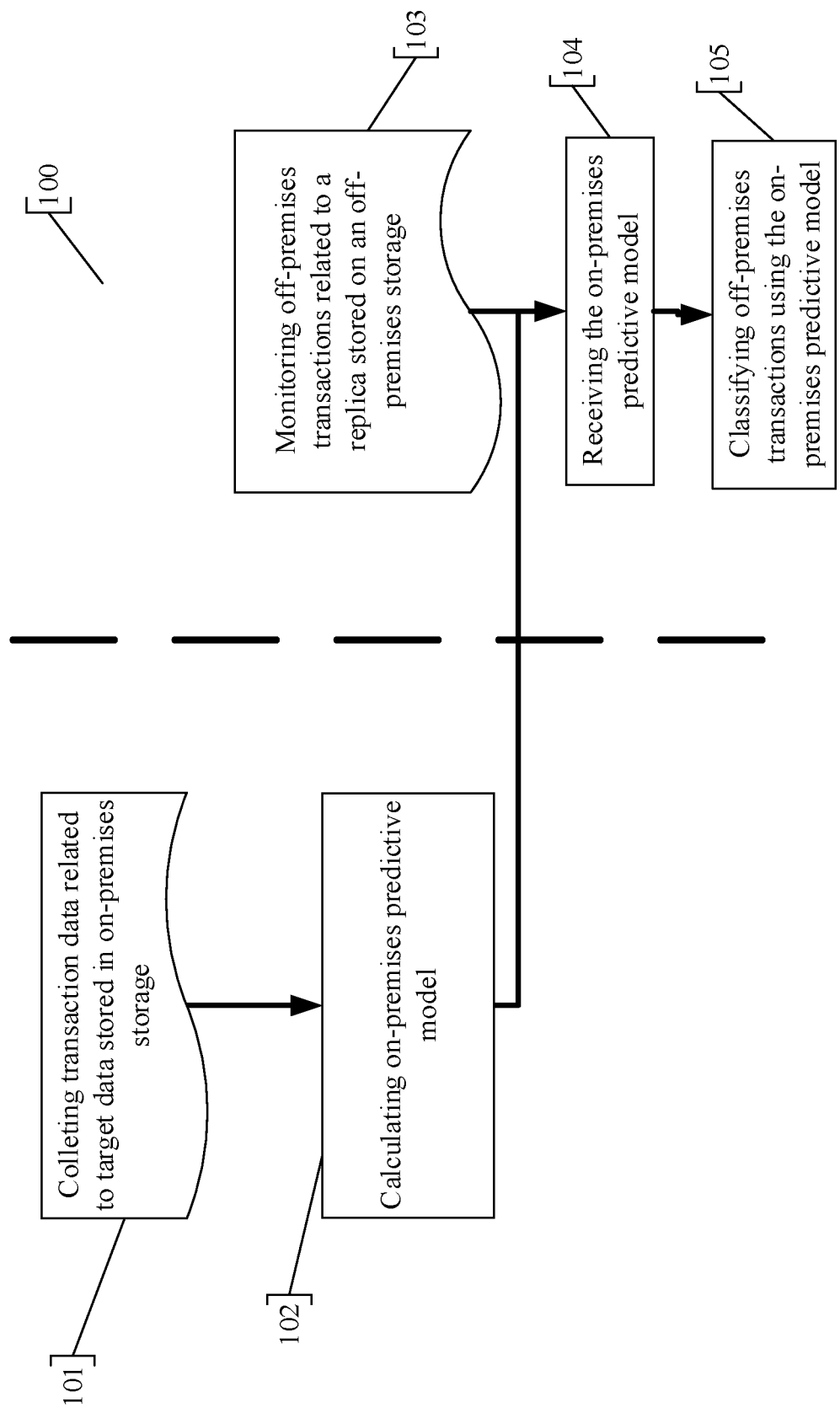
FIG. 1 is an illustration of a flowchart of a process for classifying off-premises transactions monitored at an off-premises storage based on a security model learned from transaction data of an on-premises device, according to some examples of the present invention.

The heterogeneity of data sources for off-premises storage, such as cloud storage, makes it very complex to create an efficient baseline for anomaly and/or malfunctioning detection. As accesses to old working sets are usually rare and may be flagged as with a high false-positive rate. A false-positive rate may lead an operator, for instance a system administrator, to ignore notifications and/or to shut down alerting options. By ignoring or shutting down alerts or notification, rarely-accessed accounts may remain under protected and vulnerable to many types of attacks.

According to some examples described herein there are provided methods and systems of classifying network accessible storage transactions based on data from a security model for anomaly or malfunctioning detection. The security model is created dynamically by an analysis of transactions made to access target data stored in a certain storage device and the data from the security model is used for classifying transactions made to access a replica of the target data when the replica is stored in another storage device.

According to some examples which are described herein there are provided methods and systems for classifying off-premises transactions monitored at off-premises storage, for instance cloud storage, based on a security model learned from transaction data associated with target data that is stored in on-premises storage of an on-premises device, such as a client terminal. The security model is optionally adapted based on activity (also referred to as a behavior) detected on the off-premises storage and used for detecting anomalies among transactions associated with a replica of the target data which is stored in off-premises storage. The methods and systems which are outlined herein and described below provide an efficient learning model for anomaly and/or malfunctioning detection without requiring substantial investment. By using this learning model, false positive detection of anomalies is reduced and hence the credibility of detection alerts is increased as described below. Inventors are not aware of solutions for false positive reduction which are particularly tailored for data without context such as replicas of working datasets which are stored for backup and/or computation efficiency at an off-premises storage system, for instance cloud storage. The solution described herein does not require building expensive complex models on a large number of real storage accounts and requires less implementation efforts.

Before explaining at least one example of the exemplary examples in detail, it is to be understood that the disclosure is not necessarily limited in its application to the details of construction and the arrangement of the components and/or methods set forth in the following description and/or illustrated in the drawings and/or the Examples. The disclosure is capable of other examples or of being practiced or carried out in various ways.

Reference is now made to FIG. 1 which illustrates a flowchart of a process for classifying off-premises transactions monitored at an off-premises storage based on a security model learned from transaction data of an on-premises device, according to some examples of the present invention.

The process allows applying anomaly and/or malfunctioning detection schemes in an off-premises storage based on baseline data built based on normal traffic activities and standard configurations monitored in on-premises storage. In such a manner, hurdles emerging from heterogeneity of data sources which are loaded to off-premises storage such as cloud storage are overcome. Moreover, this allows reducing false positive detection of access to old working sets which are rarely accessed.

Figure 2:
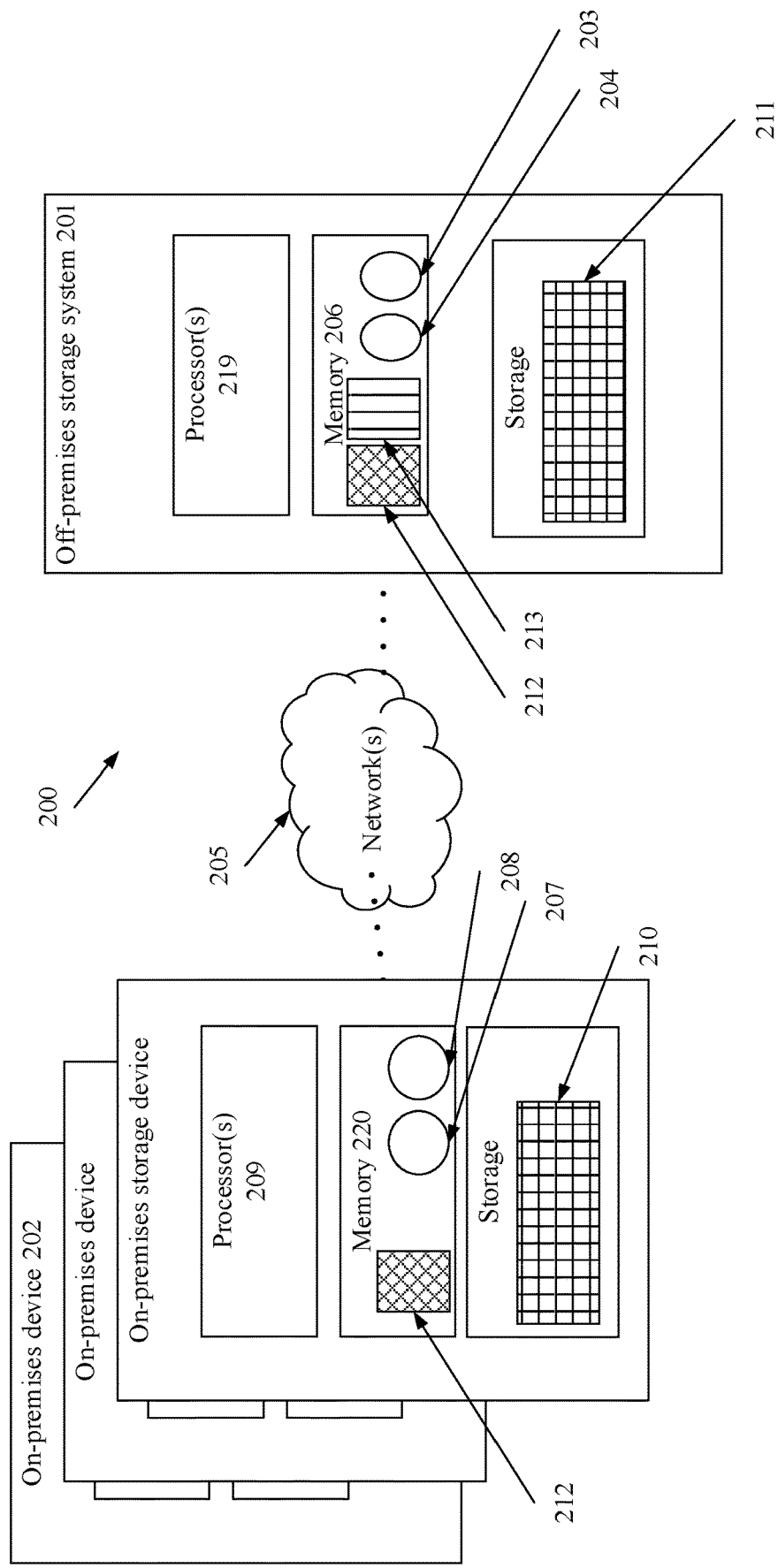
FIG. 2 is a schematic illustration of a system for classifying off-premises transactions monitored at an off-premises storage based on a security model learned from transaction data of an on-premises device, for instance by implementing FIG. 1, according to some examples of the present invention.

Reference is also made to FIG. 2, which is a schematic illustration of a system 200 for classifying off-premises transactions, also referred to as network accessible storage transactions, at off-premises storage of an off-premises storage system 201 based on an on-premises predictive security model learned from transaction data of an on-premises device 202, according to some examples of the present invention. The off-premises storage system 201, for example a cloud storage server or a virtual machine executed on one or more servers, and the on-premises device 202, for example a client terminal, such as a personal computer, smartphone, and/or the like are connected to a network 205, such as a wide area network (WAN) and/or one or more local area networks (LANs), either wired and/or wireless. The system 200 includes an off-premises storage modeler 203 and off-premises detection module 204, for instance software components, stored in memory 206 of the off-premises storage system 201 and executed by the processor(s) 219 of the off-premises storage system 201. The system 200 optionally includes or communicating with an on-premises storage modeler 207 and an on-premises detection module 208, for instance software components, stored in memory 220 of the on-premises storage device 202 and executed by the processor(s) 209 of the on-premises storage device 202.

In use, the on-premises storage modeler 207 dynamically creates an on-premises security model by an analysis of a plurality of on-premises transactions made to access target data 210, also referred to as client transactions, such as working set(s) (e.g. e pages in virtual address space of processes resident in physical memory), while the target data 210 is stored in an client computing device. The on-premises security model may also be trained based on an anomaly baseline that is created from an analysis of the plurality of on-premises transactions.

The on-premises security model may be used by the detection module 208 for local anomaly and/or malfunctioning detection, for instance for detecting deviations from a baseline which are indicative of a threat such as an unauthorized trial to access or manipulate data and/or any malware activity and/or system malfunctioning.

Optionally, as shown at 101, the on-premises storage modeler 207 optionally collects access log(s), maintenance log(s), deployment log(s) and/or configuration (config) log(s) associated with the target data 210. Optionally, related data such as snapshots of old working sets stored or previously used by the on-premises device 202 is also stored and/or mapped.

This allows, as shown at 102, to calculate an on-premises predictive security model 212, also referred to as a client predictive security model, from features extracted from the collected logs and/or related data. Features may be data volume accesses, read transactions data, write transactions data, source internet protocol (IP) used for login actions, time of login actions, credentials, user privilege level data, time of accessing data, frequency of accessing data and/or the like. The on-premises predictive security model 212 may be locally calculated by the on-premises storage modeler 207 and/or by a component residing on another device. Optionally, tags for supervised learning are also extracted from the target data for supporting a calculation of a classifier, for instance a statistical classifier.

The on-premises predictive security model 212 optionally includes or based on one or more baselines for anomaly and/or malfunctioning detection, a classifier using the tags for supervised learning for classifying security event(s), a one-class model for benign or malicious activity, and/or a model clustering of users, accounts and/or activities and/or any combination thereof. The on-premises predictive security model 212 may be received from any component or entity which monitors the target data.

Now, as shown at 103, after a replica 211 of the target data is stored in a storage managed by the off-premises storage system 201, off-premises transactions made to access or process the replica 211 are monitored by the off-premises storage modeler 203 and/or off-premises detection module 204.

Optionally, the replica 211 and a respective copy of the on-premises predictive security model 212 are forwarded to the off-premises storage system 201 in a correlated manner, for instance together or sequentially, optionally over the network 205. The replica 211 and a respective copy of the on-premises predictive security model 212 are optionally stored in association with one another such that anomaly detection related to the replica is supported by the respective copy of the on-premises predictive security model 212, for example as described herein. In such examples, the off-premises storage system 201 may host a plurality of different replicas of different devices, each associated with a respective copy of an on-premises predictive security model generated by monitoring data replicated in the associated replica. Optionally, when a replica of a working set is updated a new copy of the respective on-premises predictive security model is acquired.

As shown at 104, after, before or during the storing of the replica 211 of the target data on the off-premises storage system 201, a copy of the on-premises predictive security model 212 is received or selected to be used by the off-premises storage modeler 203 and/or off-premises detection module 204.

The predictive security model 212 allows the off-premises detection module 204, as shown at 105, to classify transactions and other data behavior indicators observed by monitoring the replica 211 based on the on-premises predictive security model 212. Optionally the classification is indicative of normality, an anomaly, a malfunctioning and/or the like. Optionally, an indication of a prediction such as anomaly and/or malfunctioning detection or normal activity detection is outputted to present to a user and/or an administrator. Optionally, the indication is added to a log or a dataset and/or forwarded as a push notification, for example as a notification, an email, and/or an instant messaging message or a short message service (SMS) message to an operator. The output may be an input of another system, for instance a risk analysis system, a bot and/or the like.

Figure 3:
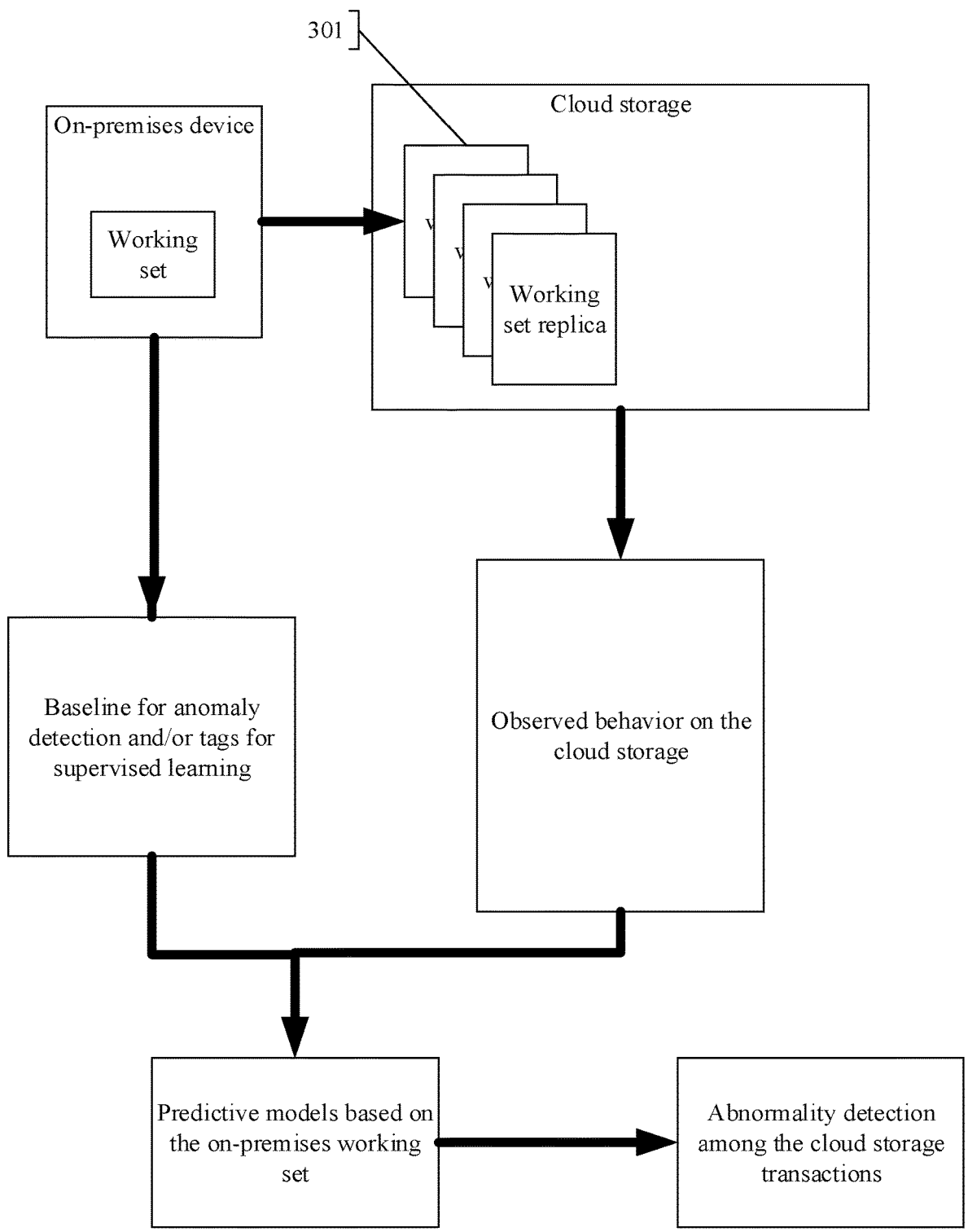
FIG. 3 is a schematic illustration of a flow of data in a system for classifying off-premises transactions monitored at an off-premises storage based on a security model learned from transaction data of an on-premises device, for instance using a system as depicted in FIG. 2, according to some examples of the present invention.

For example reference is also made to FIG. 3 which is a schematic illustration of a flow of data in a system for classifying off-premises transactions monitored at an off-premises storage based on an on-premises predictive security model learned from transaction data of an on-premises device, for instance using a system as depicted in FIG. 2, according to some examples of the present invention. As shown at 301, replicas of working sets from an on-premises device are stored in cloud storage. On-premises predictive security model(s), for instance as described above, are calculated and/or trained based on baselines for detection abnormality which are built based on transactions associated with the replicated working set(s) and/or based on tags for supervised learning. The premises predictive security model(s) are scored based on transactions associated with replica(s) of the working set(s) which are stored at the cloud storage. In use, the predictive security model(s) are used for anomaly detection among transactions held with respect to the replica(s) of the working set(s).

According to some examples of the present invention, the features derived from the target data 210 are used for ranking and/or classifying the replica 211, for instance into a dataset class, such as "a stable dataset" or "a transient dataset". For example, datasets are clustered based on these features in an unsupervised manner and the clusters are used to deduce to which cluster the replica belongs to. This classification is optionally used in order to choose an on-premises predictive security model or an appropriate on-premises predictive security model template for creating an on-premises predictive security model from a set of multiple models or templates for classifying transactions observed with reference to the replica 211.

According to some examples of the present invention, a number of optional on-premises predictive security models are selected and/or created for detecting abnormalities in transactions related to the replica 211. For example, the on-premises predictive security model 212, an off-premises on-premises predictive security model 213 calculated based on transactions monitored by the off-premises storage modeler 203 and a combination of the on-premises predictive security model 212 and the off-premises on-premises predictive security model 213 are made available to the off-premises detection module 204 for detecting abnormalities in transactions related to the replica 211. In such examples, selection may be made based on abnormality detection rules, for example abnormality detection rules dividing transactions related to different datasets to be evaluated based on different models. Additionally or alternatively, selection may be made based on historical performances. Additionally or alternatively, transactions are evaluated in parallel by the on-premises predictive security model 212, off-premises on-premises predictive security model 213, and a combination on the on-premises predictive security models 212, 213. In such examples, a decision to issue an abnormality detection notification is based on having one or more positive evaluations. Optionally, a decision to issue an abnormality detection notification is based on a weighted function that takes into account an outcome of a number of evaluations made with a number of different models.

Optionally, a user interface, such as a graphical user interface (GUI) is used for defining or editing abnormality detection rules and/or learning policies for creating the off-premises on-premises predictive security model 213, also referred to as network accessible storage security model and/or for editing the combination of models. For example, rules which are based on a level of activity, a volume of data, a performance of predictive accuracy and/or what-if analysis simulation based on past data and detections may be defined.

The methods and the systems which are described above relates to classification of network accessible storage transactions made to access a replica of target data stored in a network accessible storage based on data from a security model created dynamically by an analysis of transactions made to access the target data when it was stored in a client. By way of example, the above description may be used for teaching classification of network accessible storage transactions made to access a replica of target data stored in a certain storage based on data from a security model created dynamically by an analysis of transactions made to access the target data when it was stored in storage.

It is expected that during the life of a patent maturing from this application many relevant systems and processes will be developed and the scope of the term a module, a processor, a network and/or the like is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

According to some embodiments of the present invention there is provided a computerized method of classifying off-premises transactions at off-premises storage. The computerized method comprises obtaining an on-premises predictive security model for anomaly or malfunctioning detection, the on-premises predictive security model is dynamically created by an analysis of a plurality of on-premises transactions made to access target data stored in an client computing device, monitoring a plurality of off-premises transactions made to access a replica of the target data when the replica is stored in an off-premises computing storage, also referred to as network accessible storage, and classifying at least some of the plurality of off-premises transactions based on the on-premises predictive security model.

Optionally, the on-premises predictive security model comprises a classifier calculated using tagged data for classifying security events.

Optionally, the on-premises predictive security model comprises or created based on at least one baseline for anomaly or malfunctioning detection.

Optionally, the on-premises security model is created by an additional analysis of at least one member of a group consisting of collects access logs, maintenance logs, deployment logs and/or configuration logs associated with the target data.

Optionally, the method further comprises classifying the replica based on an analysis of a plurality of features of the target data; wherein the on-premises predictive security model is selected from a plurality of on-premises predictive security models created according to the analysis of a plurality of on-premises transactions.

More optionally, the plurality of features comprises at least one member of a group consisting of data volume accesses, read transactions data, write transactions data, source internet protocol (IP) used for login actions, time of login actions, credentials, user privilege level data, time of accessing data, and frequency of accessing data.

Optionally, the method further comprises clustering a plurality of datasets from the target data into a plurality of dataset clusters based on unsupervised learning techniques and classifying the replica accordingly.

Optionally, the method further comprises creating an off-premises data model by adapting the on-premises predictive security model according to an analysis of the plurality of off-premises transactions.

More optionally, the classifying comprises selecting one of a plurality of on-premises predictive security models, the off-premises data model, and a combination of the on-premises predictive security model and the off-premises data model based on abnormality detection rules.

More optionally, the classifying comprises selecting one of the on-premises predictive security model, the off-premises data model, and a combination of the on-premises predictive security model and the off-premises data model based on historical performances of the on-premises predictive security model, the off-premises data model, and the combination.

More optionally, the classifying is based on a weighted function that takes into account an outcome of the on-premises predictive security model and the off-premises data model.

More optionally, the classifying is adjusted according a user input acquired using a graphical user interface.

According to some embodiments of the present invention there is provided a system that comprises at least one processor and memory including computer-executable instructions that, based on execution by the at least one processor, configure the at least one processor to: obtain an on-premises predictive security model for anomaly or malfunctioning detection, the on-premises predictive security model is dynamically created by an analysis of a plurality of on-premises transactions made to access target data stored in an client computing device, monitor a plurality of off-premises transactions made to access a replica of the target data when the replica is stored in an off-premises computing storage, and classify at least some of the plurality of off-premises transactions based on the on-premises predictive security model.

Optionally, the on-premises predictive security model comprises a classifier calculated using tagged data for classifying security events.

Optionally, the on-premises predictive security model comprises or created based on at least one baseline for anomaly or malfunctioning detection.

Optionally, the on-premises security model is created by an additional analysis of at least one member of a group consisting of collects access logs, maintenance logs, deployment logs and/or configuration logs associated with the target data.

Optionally, the at least one processor is adapted to cluster a plurality of datasets from the target data into a plurality of dataset clusters based on unsupervised learning techniques and to perform the classification of the replica accordingly.

Optionally, the at least one processor is adapted to creates an off-premises data model by adapting the on-premises predictive security model according to an analysis of the plurality of off-premises transactions.

Optionally, the at least one processor is adapted to classify the at least some off-premises transactions is based on a weighted function that takes into account an outcome of the on-premises predictive security model and the off-premises data model.

According to some embodiments of the present invention there is provided a software program product that comprises a non-transitory computer readable storage medium, first program instructions to obtain an on-premises predictive security model for anomaly or malfunctioning detection, the on-premises predictive security model is dynamically created by an analysis of a plurality of on-premises transactions made to access target data stored in an client computing device, second program instructions to monitor a plurality of off-premises transactions made to access a replica of the target data when the replica is stored in an off-premises computing storage, and third program instructions to classify at least some of the plurality of off-premises transactions based on the on-premises predictive security model. The program instructions are executed by at least one computerized processor from the non-transitory computer readable storage medium.

Certain features of the examples described herein, which are, for clarity, described in the context of separate examples, may also be provided in combination in a single example. Conversely, various features of the examples described herein, which are, for brevity, described in the context of a single example, may also be provided separately or in any suitable sub-combination or as suitable in any other described example of the disclosure. Certain features described in the context of various examples are not to be considered essential features of those examples, unless the example is inoperative without those elements.

What is claimed is:

1. A computerized method of classifying network accessible storage transactions at network accessible storage, comprising:
    accessing a client predictive security model for anomaly and malfunctioning detection, the client predictive security model having been dynamically created by an analysis of a plurality of client transactions made to access on-premises target data stored in an on-premises client computing device;
    monitoring a plurality of network accessible storage transactions made to access a replica of the target data when the replica is stored off-premises in an network accessible storage; and
    classifying at least some of the plurality of network accessible storage transactions based on the client predictive security model.

2. The computerized method of claim 1, wherein the client predictive security model comprises a classifier calculated using tagged data for classifying security events.

3. The computerized method of claim 1, wherein the client predictive security model comprises at least one baseline for anomaly or malfunctioning detection or is created based on the at least one baseline for anomaly or malfunctioning detection.

4. The computerized method of claim 1, wherein the predictive security model is created by an additional analysis of at least one member of a group consisting of access logs, maintenance logs, deployment logs and/or configuration logs associated with the target data.

5. The computerized method of claim 1, further comprising classifying the replica based on an analysis of a plurality of features of the target data; wherein the client predictive security model is selected from a plurality of client predictive security models created according to the analysis of a plurality of client transactions.

6. The computerized method of claim 5, wherein the plurality of features comprises at least one member of a group consisting of data volume accesses, read transactions data, write transactions data, source internet protocol (IP)

used for login actions, time of login actions, credentials, user privilege level data, time of accessing data, and frequency of accessing data.

7. The computerized method of claim 1, further comprising clustering a plurality of datasets from the target data into a plurality of dataset clusters based on unsupervised learning techniques and classifying the replica accordingly.

8. The computerized method of claim 1, further comprising creating an network accessible storage data model by adapting the client predictive security model according to an analysis of the plurality of network accessible storage transactions.

9. The computerized method of claim 8, wherein the classifying comprises selecting one of a plurality of client predictive security models, the network accessible storage data model, and a combination of the client predictive security model and the network accessible storage data model based on abnormality detection rules.

10. The computerized method of claim 8, wherein the classifying comprises selecting one of the client predictive security model, the network accessible storage data model, and a combination of the client predictive security model and the network accessible storage data model based on historical performances of the client predictive security model, the network accessible storage data model, and the combination.

11. The computerized method of claim 8, wherein the classifying is based on a weighted function that takes into account an outcome of the client predictive security model and the network accessible storage data model.

12. The computerized method of claim 8, wherein the classifying is adjusted according a user input acquired using a graphical user interface.

13. A system, comprising:
at least one processor; and
memory including computer-executable instructions that, when executed by the at least one processor, configure the at least one processor to:
access a client predictive security model for anomaly and malfunctioning detection, the client predictive security model having been dynamically created by an analysis of a plurality of client transactions made to access on-premises target data stored in an on-premises client computing device;
monitor a plurality of network accessible storage transactions made to access a replica of the target data when the replica is stored off-premises in an network accessible storage; and
classify at least some of the plurality of network accessible storage transactions based on the client predictive security model.

14. The system of claim 13, wherein the client predictive security model comprises a classifier calculated using tagged data for classifying security events.

15. The system of claim 13, wherein the client predictive security model comprises at least one baseline for anomaly or malfunctioning detection or is created based on the at least one baseline for anomaly or malfunctioning detection.

16. The system of claim 13, wherein the predictive security model is created by an additional analysis of at least one member of a group consisting of access logs, maintenance logs, deployment logs and/or configuration logs associated with the target data.

17. The system of claim 13, wherein the at least one processor is adapted to cluster a plurality of datasets from the target data into a plurality of dataset clusters based on unsupervised learning techniques and to perform the classification of the replica accordingly.

18. The system of claim 13, wherein the at least one processor is further configured to create a network accessible storage data model by adapting the client predictive security model according to an analysis of the plurality of network accessible storage transactions.

19. The system of claim 13, wherein the at least one processor is further configured to classify the at least some network accessible storage transactions based on a weighted function that takes into account an outcome of the client predictive security model and the network accessible storage data model.

20. A software program product, comprising:
computer readable physical memory having computer executable instructions encoded therein which, when executed by one or more processors in a computing environment, cause the computing environment to:
access a client predictive security model for anomaly and malfunctioning detection, the client predictive security model having been dynamically created by an analysis of a plurality of client transactions made to access on-premises target data stored in an on-premises client computing device;
monitor a plurality of network accessible storage transactions made to access a replica of the target data when the replica is stored off-premises in an network accessible storage; and
classify at least some of the plurality of network accessible storage transactions based on the client predictive security model.

* * * * *